No. 664,003. Patented Dec. 18, 1900.
J. A. REYNOLDS, A. P. BROSIUS & J. W. UNGER.
MACHINE FOR REPAIRING VEHICLE AXLES.
(Application filed Sept. 4, 1900.)
(No Model.)
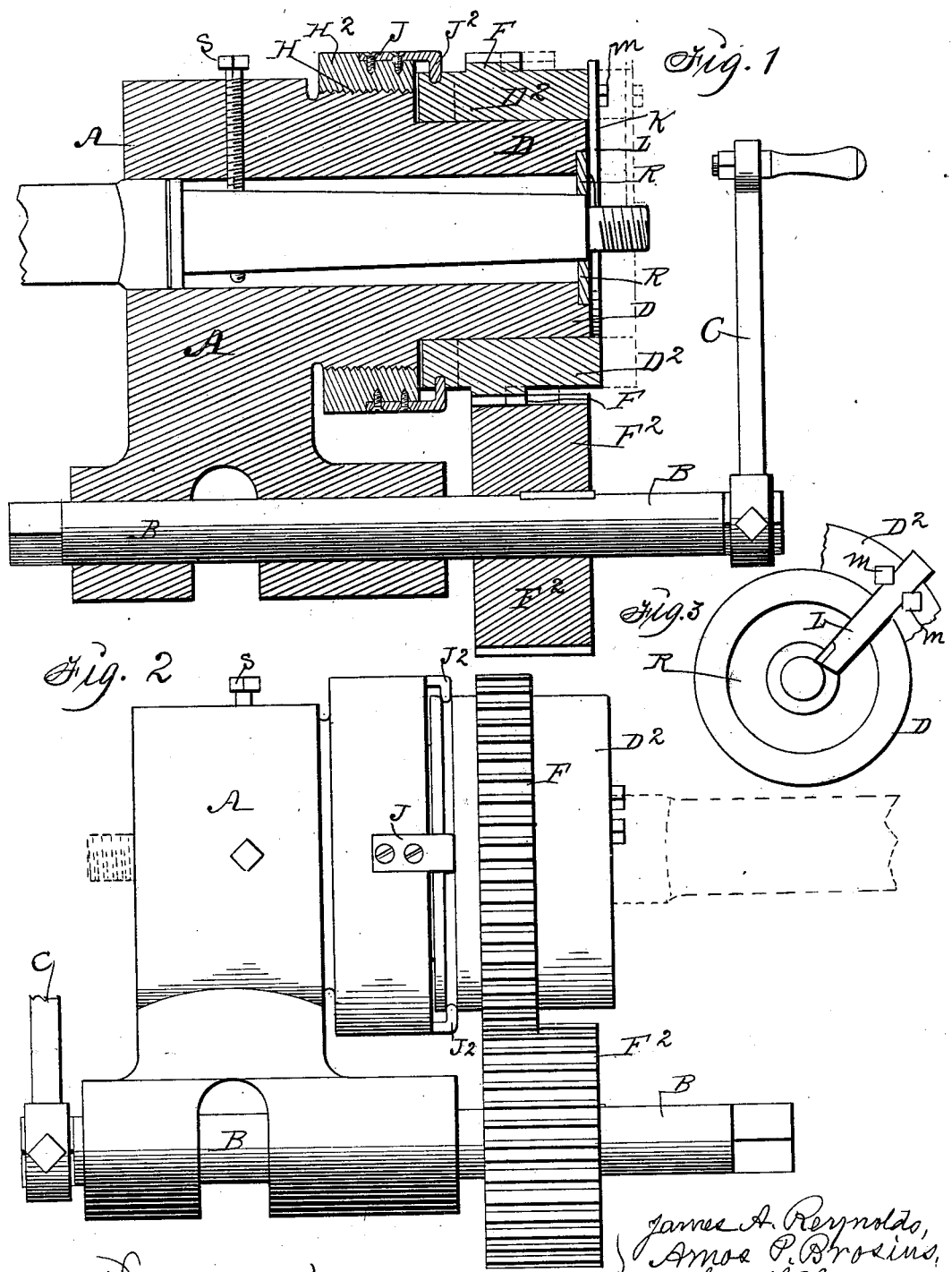
Witnesses:
F. C. Stuart,
R. H. Orwig.
Inventors:
James A. Reynolds,
Amos P. Brosius,
John W. Unger.
By Thomas G. Orwig, Attorney.
THE NORRIS PETERS CO., PHOTO-LITHO., WASHINGTON, D. C.

UNITED STATES PATENT OFFICE.

JAMES A. REYNOLDS, AMOS P. BROSIUS, AND JOHN W. UNGER, OF CARROLL, IOWA.

MACHINE FOR REPAIRING VEHICLE-AXLES.

SPECIFICATION forming part of Letters Patent No. 664,003, dated December 18, 1900.

Application filed September 4, 1900. Serial No. 28,953. (No model.)

*To all whom it may concern:*

Be it known that we, JAMES A. REYNOLDS, AMOS P. BROSIUS, and JOHN W. UNGER, citizens of the United States, residing at Carroll, in the county of Carroll and State of Iowa, have invented a new and useful Machine for Repairing Vehicle-Axles, of which the following is a specification.

Our object is to provide a simple, strong, and durable machine specially adapted for repairing vehicles when the spindles are worn and the wheels thereon become loose and wabble and rattle.

Heretofore washers have been placed against the annular shoulders of spindles and hand-lathes have been used for reducing the lengths of spindles; but in no instance has a machine been applied direct to a spindle for extending the inner or rear end of a spindle and also reducing the outward end in such a manner that the length of the spindle will be maintained and its worn diameter from end to end restored to its original size as required to fill the boxing in the hub of the wheel as originally fitted thereto as contemplated by our invention.

Our invention consists in the construction, arrangement, and combination of parts, as hereinafter set forth, pointed out in our claims, and illustrated in the accompanying drawings, in which—

Figure 1 is a central vertical and longitudinal sectional view of the machine in position on an axle as required for reducing the free or outer end of the spindle. Fig. 2 is a side elevation of the machine in a reversed position to an axle, indicated by dotted lines, as required to shorten the axle and lengthen the spindle at its inner or rear end. Fig. 3 is a face view of the end of the rotatable hub that carries a cutter and of a collar fitted in a recess in the hub.

The letter A designates a cast-metal frame that has a longitudinal bore of uniform diameter in its top portion extending from end to end and adapted to admit an axle and its spindle, as shown in Fig. 1.

B is a rotatable shaft mounted in bearings in the lower part of the frame, and each end of the shaft is angular and adapted for applying a crank-handle C thereto.

The one end portion of the frame A is cylindrical and serves as a journal D, upon which is mounted a hub $D^2$, and formed on or fixed to the hub is a toothed wheel F. In rear of the journal D and integral with the frame A is a screw H, and on the screw is a feed-nut $A^2$, and the nut is rotatably connected with the hub $D^2$ by means of elbow-shaped fingers J, fixed to the feed-nut and extending into a continuous groove $J^2$ in the periphery of the hub as required for moving the hub longitudinally relative to the journal D and a spindle extended through the frame and journal, as shown in Fig. 1.

A toothed wheel adapted to engage the wheel F is fixed on the shaft B in such a manner that when the shaft is rotated the wheel F and hub D will be jointly rotated.

In the front face of the hub $D^2$ is a dovetail groove K, extending radially relative to the axis of the hub, and L is a cutter detachably fixed in said groove by means of set-screws $m$ and as required to retain the cutting edge against the annular shoulders at the ends of the spindle.

The bore in the end of the journal D is enlarged to admit an annular collar to retain the small end of the spindle in concentric position within the bore.

Set-screws $s$ are seated in the frame A as required to engage and fasten the spindle in the bore, as shown in Fig. 1.

In the practical use of the machine the feed-nut $H^2$ is rotated by hand as required to adjust the hub D to bring it into position, as indicated by dotted lines in Fig. 1. By then rotating the shaft B the fixed toothed wheel $F^2$ will rotate the wheel F, and the hub $D^2$ on the journal D and the cutter L will shave off the annular face of the small end of the spindle as the operation of the shaft continues, and while at the same time the feed-nut $H^2$ is operated by hand as required to feed the cutter to the end of the spindle. To cut away from the annular shoulder at the rear and large end of the spindle the machine is placed on the axle, as shown in Fig. 2, and then operated in the same manner. It is obvious that when a spindle is worn and reduced in diameter it can be thus restored to its former diameter without diminishing its length and practically renewed and refitted to the boxing in the hub of the wheel by any farmer or person of ordinary mechanical skill and at a nominal cost of time and labor.

Having thus described the construction and operation of our invention, the practical utility thereof will be readily understood by persons familiar with the art to which it pertains, and what we claim as new, and desire to secure by Letters Patent, is—

1. In a machine for repairing worn spindles, a metal frame having a longitudinal bore of uniform diameter from end to end to admit a spindle, a journal integral with one end of the frame, an external screw at the rear end of the journal, bearings at its lower end to support a rotatable shaft and means for detachably fastening the frame to a spindle, for the purposes stated.

2. In a machine for repairing spindles, a metal frame having a longitudinal bore in its top portion, bearings for a rotatable shaft at its bottom, a journal for a rotatable hub at one end portion, a feed-screw on its periphery in rear of the journal, a collar fitted in an annular recess in the end of the journal and set-screws seated in the frame to engage and fasten a spindle in the bore, in the manner set forth for the purposes stated.

3. In a machine for repairing spindles, a frame having a journal at one end, set-screws seated in the frame to engage and fasten a spindle, a bore extended longitudinally through the frame and hub, a rotatable hub fitted on the journal, a toothed wheel on the exterior of the hub, an external screw at the rear end of the journal, a feed-nut fitted on said screw and rotatably connected with the rotatable hub, a cutter detachably fixed in a radial groove in the face of the hub and means for rotating the hub and toothed wheel thereon, arranged and combined to operate in the manner set forth for the purposes stated.

4. In a machine for repairing spindles, a frame having a journal at one end and a bore extended through the journal and frame, screws seated in the frame to engage a spindle, a hub carrying a cutter on its front face fitted on the journal and provided with a continuous groove in its rear end, a toothed wheel on the exterior of the hub, an external screw on the frame in rear of the journal and concentric therewith, a feed-nut on said screw, elbow-shaped fingers fixed to the feed-nut and terminating in said groove in the hub, and means for rotating the toothed wheel on the exterior of the hub, arranged and combined to operate in the manner set forth for the purposes stated.

5. A machine for repairing spindles on the ends of axles, comprising a frame having a journal at one end and a bore extended through the frame and journal to admit the end of an axle, a screw at the rear end of the journal and a bearing at the lower end of the frame for a rotatable shaft, a hub having a toothed wheel on its periphery and carrying a cutter on its end fitted on said journal, a feed-nut on said screw rotatably connected with the hub, a rotatable shaft in the bearings in the lower end of the frame, a toothed wheel fixed on the shaft to engage the toothed wheel on the hub and means for fixing the machine on a spindle, arranged and combined to operate in the manner set forth for the purposes stated.

JAMES A. REYNOLDS.
AMOS P. BROSIUS.
JOHN W. UNGER.

Witnesses:
J. S. WRIGHT,
F. J. GUTHRIE.